Figure 1:
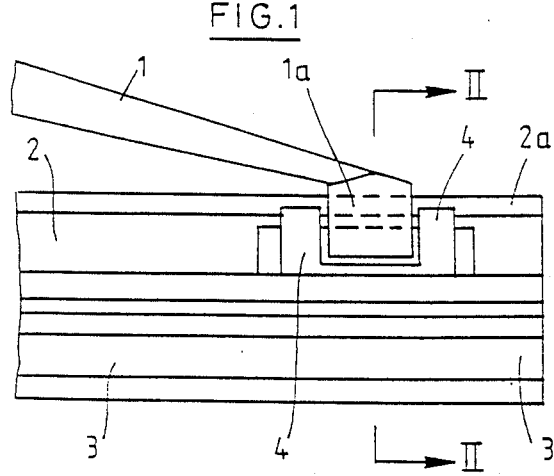

United States Patent [19]

Verton

[11] Patent Number: 4,944,064
[45] Date of Patent: Jul. 31, 1990

[54] WIPER BLADE WITH RETENTION MEANS

[75] Inventor: Jose Verton, Saint-Vincent, Belgium

[73] Assignee: Champion Spark Plug Europe S.A., Belgium

[21] Appl. No.: 288,286

[22] Filed: Dec. 21, 1988

[30] Foreign Application Priority Data

Feb. 1, 1988 [GB] United Kingdom ............... 8802154

[51] Int. Cl.$^5$ .............................................. B60S 1/38
[52] U.S. Cl. ............................. 15/250.42; 15/250.41; 15/250.4; 15/250.36
[58] Field of Search ............. 15/250.42, 250.41, 250.4, 15/250.36

[56] References Cited

U.S. PATENT DOCUMENTS

| | | | |
|---|---|---|---|
| 2,781,539 | 2/1957 | Oishei | 15/250.42 X |
| 2,782,445 | 2/1957 | Kronm | 15/250.42 |
| 3,041,654 | 7/1962 | Anderson | 15/250.42 |
| 3,616,485 | 11/1971 | Quinlan et al. | 15/250.42 X |
| 3,911,523 | 10/1975 | Harbison et al. | 15/250.42 |
| 4,156,951 | 6/1979 | Sharp . | |
| 4,388,742 | 6/1983 | Kimber et al. . | |
| 4,389,747 | 6/1983 | Riester . | |
| 4,501,043 | 2/1985 | Plisky . | |
| 4,566,147 | 1/1986 | Baerenwald et al. . | |

FOREIGN PATENT DOCUMENTS

| | | |
|---|---|---|
| 1045263 | 11/1958 | Fed. Rep. of Germany ... 15/250.42 |
| 2400574 | 7/1974 | Fed. Rep. of Germany . |
| 2428771 | 1/1975 | Fed. Rep. of Germany ... 15/250.42 |
| 53-16544 | 12/1978 | Japan . |
| 55-39879 | 1/1980 | Japan . |
| 2036547 | 7/1983 | United Kingdom . |

Primary Examiner—Frankie L. Stinson
Attorney, Agent, or Firm—Wood, Phillips, Mason, Rectenwald & VanSanten

[57] ABSTRACT

The wiper blade comprises a superstructure 1 provided with a claw 1a, a pressure distributing rod 2, a wiping element 3 and a retention means 4. A recess provided on the bottom portion of the pressure distributing rod 2 and a recess provided on the top portion of the wiping element 3 define a transverse opening wherein is inserted the retention means 4 which prevents any longitudinal displacement of the pressure distributing rod 2 with respect to the claw 1a and 3 with respect to the pressure distributing rod of the wiping element 2. Locking means are provided for preventing the transverse displacement of the retention means 4 with respect to the wiper blade.

9 Claims, 2 Drawing Sheets

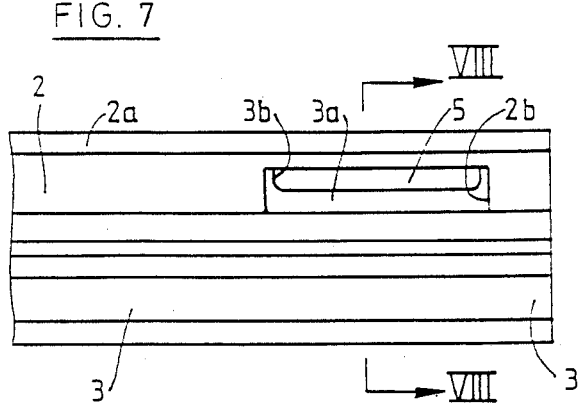
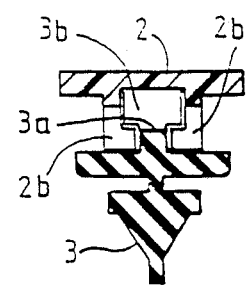
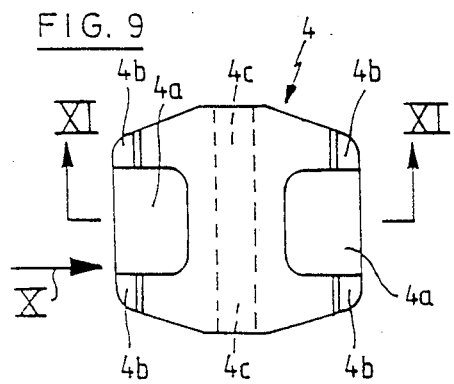
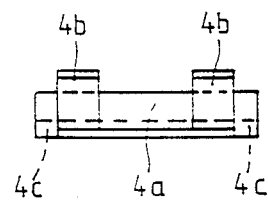
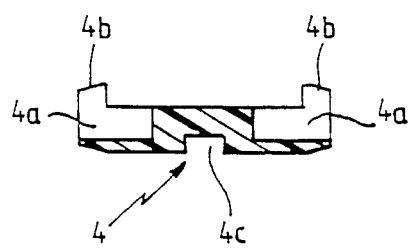
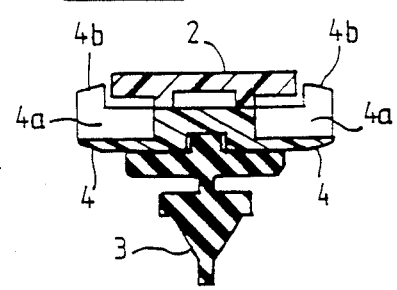

WIPER BLADE WITH RETENTION MEANS

The present invention relates to a wiper blade for motor vehicles or the like comprising a superstructure provided with at least one claw capable of gripping a longitudinally extending pressure distributing rod, a wiping element partially located in the pressure distributing rod and retention means capable of retaining the claw of the superstructure of the wiper blade on the pressure distributing rod and on the wiping element.

In particular the invention relates to said retention means which must be capable of preventing any longitudinal displacement of the pressure distributing rod with respect to the claw or claws of the superstructure of the wiper blade as well as any longitudinal displacement of the wiping element with respect to the pressure distributing rod.

Moreover the retention means should be easily removable so that a worn wiping element can be easily replaced by a new one, even by a person who is not familiar with wiper blades.

In corresponding prior art wiper blades, such as for example those disclosed in U.S. Pat. Nos. 4,501,043 and 4,566,147, the retention means consist in fact of two devices, i.e. one device for preventing any longitudinal displacement of the pressure distributing rod with respect to the claws of the superstructure of the wiper blade and a second device for preventing any longitudinal displacement of the wiping element with respect to the pressure distributing rod. Furthermore, in most of the prior art wiper blades the wiping element cannot be easily removed from the pressure distributing rod, i.e. a worn wiping element cannot or cannot be easily replaced by a new one.

A first object of the invention is to provide a wiper blade wherein the above defined retention means consists of one single device capable of retaining the pressure distributing rod and the wiping element on the superstructure of the wiper blade and capable of preventing the two above mentioned longitudinal displacements between different parts of the wiper blade.

A second object of the invention is to provide a wiper blade of the above defined type wherein the retention means is designed in a way such as to permit the easy removal and the easy replacement of a worn wiping element.

The wiper blade according to the invention is substantially characterized by the fact that:

(a) the pressure distributing rod is locally provided, on its bottom portion, with a longitudinally extending recess, (b) the wiping element is locally provided, on its top portion, with a longitudinally extending recess, (c) said to recesses define a transverse opening in the assembly pressure distributing rod/wiping element in the area of the claw of the superstructure of the wiper blade, (d) the retention means is capable of embracing separately each of the two legs of the claw of the superstructure and is located in said transverse opening, and (e) the retention means is provided on each lateral side of the pressure distributing rod with at least one upwardly projecting stop means.

It is to be noted that the retention means can either be provided with said upwardly projecting stop means or it can be provided, on its bottom portion, with a longitudinally extending recess wherein is located a portion of the wiping element, or it can be provided with both said features.

Further features of the wiper blade according to the invention are for example:

the pressure distributing rod is made of a plastic material and comprises a top wall and two downwardly extending side walls, the wiping element is made of an elastomer and is partially located in a substantially T-shaped recess provided in the pressure distributing rod, and the claw of the superstructure of the wiper blade is made of a plastic material and grips a laterally projecting shoulder respectively provided on each longitudinal side of the pressure distributing rod.

Figure 2:
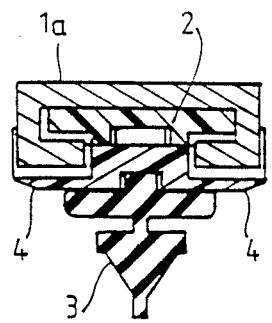
Figure 3:
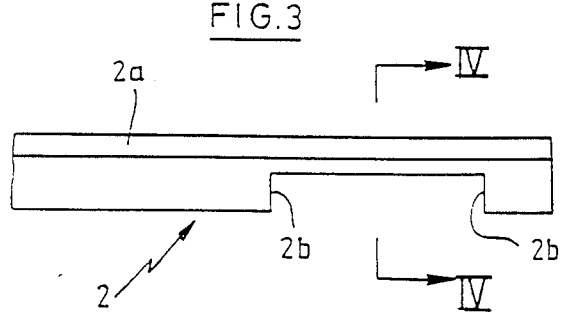
Figure 4:
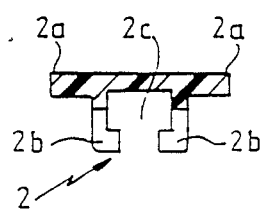
Figure 5:
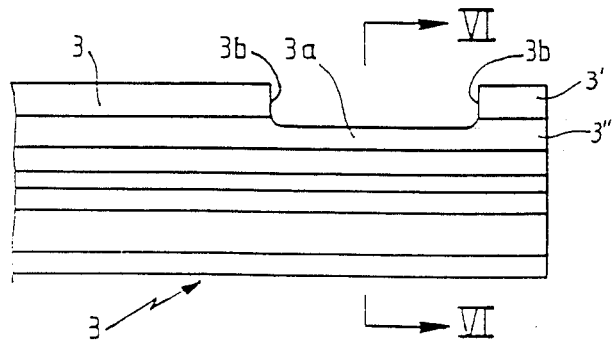
Figure 6:
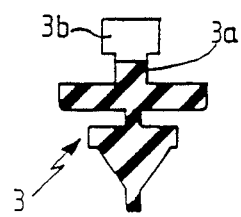

The wiper blade according to the invention will be better understood when reading the following portions of the description in accordance with the appended drawings, wherein:

FIG. 1 is a partial elevational view of the wiper blade according to the invention, FIG. 2 is a sectional view along line II—II of the wiper blade of FIG. 1, FIG. 3 is a partial elevational view of the pressure distributing rod of the wiper blade according to the invention, FIG. 4 is a sectional view along line IV—IV of the pressure distributing rod of FIG. 3, FIG. 5 is a partial elevational view of the wiping element of the wiper blade according to the invention, FIG. 6 is a sectional view along line VI—VI of the wiping element of FIG. 5, FIG. 7 is a partial elevational view of the assembly pressure distributing rod/wiping element of the wiper blade according to the invention, FIG. 8 is a sectional view along line VIII—VIII of the assembly of FIG. 7, FIG. 9 is a top view of the retention means of the wiper blade according to the invention, FIG. 10 is an elevational view along arrow X of the retention means of FIG. 9, FIG. 11 is a sectional view along line XI—XI of the retention means of FIG. 9, and FIG. 12 is a sectional view similar to that of FIG. 8 wherein the retention means of FIG. 11 is also represented.

According to FIGS. 1 and 2 the wiper blade according to the invention comprises the following elements: the superstructure 1, the claw 1a, the pressure distributing rod 2, the wiping element 3 and the retention means 4.

FIGS. 3 and 4 show that the pressure distributing rod 2 of the wiper blade according to the invention is provided, on its bottom portion, with a longitudinally extending recess 2b and that its cross section is such as shown in FIG. 4, i.e. that it comprises a laterally projecting shoulder 2a on each of its longitudinal sides and that it is provided with a longitudinal, substantially T-shaped recess 2c.

FIGS. 5 and 6 show that the wiping element 3 of the wiper blade according to the invention is provided, on its top portion 3', with a longitudinally extending recess 3b and that its cross section is such as shown on FIG. 6, i.e. that it comprises several distinctive portions and in particular a neck portion 3''.

As can be seen in FIGS. 7 and 8, when the pressure distributing rod 2 and the wiper blade 3 are assembled, the recesses 2b and 3b of said respective elements 2, 3 define a transverse opening 5 in said assembly. The opening 5 is located in the area where the claw 1a of the superstructure 1 of the wiper blade grips or embraces the laterally projecting shoulders 2a of the pressure distributing rod 2 (FIGS. 1 and 2).

FIGS. 9 through 11 represent the retention means 4 of the wiper blade according to the invention. Said retention means 4 is provided with two lateral recesses 4a wherein the two legs of the claw 1a of the superstructure 1 will be located after assembly of the wiper blade.

The retention means 4 also comprises lateral stop means 4b which will prevent any transverse movement of it with respect to the pressure distributing rod 2 and with respect to the wiping element 3 once it has been mounted on the wiper blade (FIG. 12).

The retention means 4 can further be provided, at its bottom portion, with a longitudinally (with respect to the wiper blade) extending recess or groove 4c wherein the neck portion 3" of the wiping element 3 will be partially located after assembly of the wiper blade (FIG. 12).

FIG. 12 is the same as FIG. 2 except for the fact that the claw 1a of the superstructure 1 of the wiper blade has not been represented.

Starting from the assembly pressure distributing rod 2/wiping element 3 of FIGS. 7 and 8 the wiper blade according to the invention is assembled as follows:

the laterally projecting shoulders 2a of the pressure distributing rod 2 are inserted into the claw or claws 1a of the superstructure 1, once the claw 1a (or one of the claws) of the superstructure 1 is located in the central area of the transverse opening 5 (FIG. 7) of the assembly pressure distributing rod 2/wiping element 3, the retention means 4 is inserted into the transverse opening 5 in such a way that the two recesses 4a of the retention means 4 respectively embrace each of the two legs of the claw 1a.

The superstructure 1 of the wiper blade is now rigidly secured to the assembly pressure distributing rod 2/wiping element 3. Indeed the upwardly projecting stop means 4b (FIG. 12) of the retention means 4 prevent said retention means from falling out of the transverse opening 5 (FIG. 7).

It is to be noted that because of the stop means 4b it is necessary to slightly pull downwards the portion of the wiping element 3 (elastomer) corresponding to the transverse opening 5 when inserting the retention means 4 into said opening 5.

As mentioned already above the retention means 4 can also be provided, at its bottom portion, with a recess or groove 4c. When inserting the retention means 4 into the transverse opening 5 the neck portion 3" of the wiping element 3 corresponding to the opening 5 will jump into said recess or groove 4c and thus laterally lock the retention means 4 on the assembly pressure distributing rod 2/wiping element 3 (FIG. 12).

The two above described locking devices, i.e. the stop means 4b and the recess 4c/neck 3" device can both be used on the same retention means. It is however evident that one of said two devices is sufficient for preventing the retention means from falling out of the transverse opening 5 of the assembly pressure distributing rod 2/wiping element 3.

I claim:
1. A wiper blade for motor vehicles or the like comprising a superstructure (1) provided with at least one claw (1a) capable of gripping a longitudinally extending pressure distributing rod (2), a wiping element (3) partially located in the pressure distributing rod (2) and retention means (4) capable of retaining the claw (1a) of the superstructure (1) of the wiper blade on the pressure distributing rod (2) and on the wiping element (3), characterized in that:

(a) the pressure distributing rod (2) is locally provided, on its bottom portion, with one single longitudinally extending recess (2b), (b) the wiping element (3) is locally provided, on its top portion, with a longitudinally extending recess (3b) having substantially the same dimensions as the recess (2b) in the pressure distributing rod (2), (c) said two recesses (2b, 3b) define one single transverse opening (5) in the assembly pressure distributing rod/writing element (2, 3), (d) said single transverse opening (5) extends longitudinally through the claw (1a) of said superstructure (1), (e) the retention means (4) is located in said single transverse opening and has the form of a substantially rectangular element capable of embracing separately each of the two legs of the claw (1a) of the superstructure (1), and (f) said substantially rectangular retention means (4) located in said single transverse opening is provided on each lateral side of the pressure distributing rod (2) with at least one upwardly projecting stop means (4b).

2. A wiper blade according to claim 1 wherein the wiping element (3) comprises a top portion (3') and a neck portion (3"), characterized in that the retention means (4) is provided, on its bottom portion, with a longitudinally extending recess (4c) wherein is located at portion (3a) of the neck portion (3") of the wiping element (3).

3. A wiper blade according to claim 2, characterized in that the retention means (4) is not provided with said upwardly projecting stop means (4b).

4. A wiper blade according to claim 3, characterized in that the pressure distributing rod (2) is made of a plastic material and comprises a top wall and two downwardly extending side walls.

5. A wiper blade according to claim 2, characterized in that the pressure distributing rod (2) is made of a plastic material and comprises a top wall and two downwardly extending side walls.

6. A wiper blade according to claim 5, characterized in that the claw (1a) of the superstructure (1) of the wiper blade is made of a plastic material and that it grips a laterally projecting shoulder (2a) respectively provided on each longitudinal side of the pressure distributing rod (2).

7. A wiper blade according to claim 1, characterized in that the pressure distributing rod (2) is made of a plastic material and comprises a top wall and two downwardly extending side walls.

8. A wiper blade according to claim 7, characterized in that the wiping element (3) is made of an elastomer and that it is partially located in a substantially T-shaped recess (2c) provided in the pressure distributing rod (2).

9. A wiper blade according to claim 7, characterized in that the claw (1a) of the superstructure (1) of the wiper blade is made of a plastic material and that it grips a laterally projecting shoulder (2a) respectively provided on each longitudinal side of the pressure distributing rod (2).

* * * * *